US012563385B2

(12) United States Patent
Link et al.

(10) Patent No.: US 12,563,385 B2
(45) Date of Patent: Feb. 24, 2026

(54) ROTATING COORDINATOR IN MESH NETWORK

(71) Applicant: Schreder S.A., Brussels (BE)

(72) Inventors: Robert Link, Ratingen (DE); Udayteja Davuluru, Dusseldorf (DE); Daniel Brand, Wedemark (DE)

(73) Assignee: Schreder S.A., Brussels (BE)

( * ) Notice: Subject to any disclaimer, the term of this patent is extended or adjusted under 35 U.S.C. 154(b) by 997 days.

(21) Appl. No.: 17/424,305

(22) PCT Filed: Feb. 3, 2020

(86) PCT No.: PCT/EP2020/052578
§ 371 (c)(1),
(2) Date: Jul. 20, 2021

(87) PCT Pub. No.: WO2020/157330
PCT Pub. Date: Aug. 6, 2020

(65) Prior Publication Data
US 2022/0078607 A1 Mar. 10, 2022

(30) Foreign Application Priority Data
Feb. 1, 2019 (NL) ...................................... 2022497

(51) Int. Cl.
*H04W 4/00* (2018.01)
*H04W 12/03* (2021.01)
(Continued)

(52) U.S. Cl.
CPC ....... *H04W 12/03* (2021.01); *H04W 12/0471* (2021.01); *H04W 76/10* (2018.02); *H04W 84/18* (2013.01)

(58) Field of Classification Search
None
See application file for complete search history.

(56) References Cited

U.S. PATENT DOCUMENTS 6,980,522 B2 * 12/2005 Boyle ................... H04W 84/20
370/252
9,807,621 B1 * 10/2017 Hui ...................... H04B 17/318
(Continued)

FOREIGN PATENT DOCUMENTS

EP 1487155 A2 * 12/2004 ........ H04W 56/0015
EP 2031811 A1 * 3/2009 ............ H04W 48/12
(Continued)

OTHER PUBLICATIONS

Ali et al. "Cooperative Leader Election Algorithm for Master/Slave Mobile Ad Hoc Networks" IEEE Dec. 15-17, 2009.*
(Continued)

*Primary Examiner* — Bob A Phunkulh
(74) *Attorney, Agent, or Firm* — McDonnell Boehnen Hulbert & Berghoff LLP

(57) ABSTRACT

Example embodiments relate to rotating coordinators in mesh networks. One example mesh network includes multiple communication devices adapted to communicate in the mesh network according to a predetermined protocol. A single one of the multiple communication devices adopts a coordinator role in the mesh network for governing a commissioning procedure in the mesh network. The mesh network is configured to rotate the coordinator role among at least a selected number of the multiple communication devices so that a new communication device is detectable in the vicinity of the device adopting the coordinator role.

19 Claims, 3 Drawing Sheets

(51) Int. Cl.
H04W 12/0471 (2021.01)
H04W 76/10 (2018.01)
H04W 84/18 (2009.01)

(56) References Cited

U.S. PATENT DOCUMENTS

| | | | | |
|---|---|---|---|---|
| 10,924,343 B1* | 2/2021 | Shukla | .................. | H04L 67/104 |
| 2001/0012757 A1* | 8/2001 | Boyle | .................. | H04W 84/20 |
| | | | | 455/524 |
| 2004/0255001 A1* | 12/2004 | Oh | .................... | H04W 56/0015 |
| | | | | 709/248 |
| 2005/0090264 A1* | 4/2005 | Kim | ...................... | H04W 48/10 |
| | | | | 455/455 |
| 2005/0094574 A1* | 5/2005 | Han | ........................ | H04L 45/00 |
| | | | | 370/254 |
| 2008/0080425 A1* | 4/2008 | Lee | ...................... | H04W 36/12 |
| | | | | 370/331 |
| 2008/0112364 A1* | 5/2008 | Kwon | .................. | H04W 84/20 |
| | | | | 370/331 |
| 2009/0059919 A1* | 3/2009 | Kim | ...................... | H04W 48/12 |
| | | | | 375/295 |
| 2009/0257403 A1* | 10/2009 | Jeon | ...................... | H04W 36/12 |
| | | | | 370/331 |
| 2010/0027463 A1* | 2/2010 | Burge | .................. | H04W 84/20 |
| | | | | 370/328 |
| 2011/0096756 A1* | 4/2011 | Abramov | ................ | H01Q 3/24 |
| | | | | 370/338 |
| 2013/0183900 A1* | 7/2013 | Lee | ...................... | H04W 84/20 |
| | | | | 455/41.2 |

| | | | | |
|---|---|---|---|---|
| 2014/0056248 A1* | 2/2014 | Wang | .................... | H04L 1/1864 |
| | | | | 370/329 |
| 2015/0312915 A1* | 10/2015 | Li | ........................ | H04W 52/281 |
| | | | | 455/452.1 |
| 2015/0373753 A1* | 12/2015 | Turon | ................. | H04W 12/009 |
| | | | | 370/254 |
| 2017/0093663 A1* | 3/2017 | Douglas | ................ | H04L 41/142 |
| 2017/0111157 A1* | 4/2017 | Nagrath | .................. | H04L 69/28 |
| 2017/0339653 A1* | 11/2017 | Hui | ................... | H04W 56/0065 |
| 2018/0139728 A1* | 5/2018 | Kozura | ................. | H04W 72/04 |
| 2019/0075073 A1* | 3/2019 | Erickson | ................ | H04W 4/70 |
| 2020/0084654 A1* | 3/2020 | Kwan | ................... | H04W 40/22 |
| 2020/0084833 A1* | 3/2020 | Kwan | ................. | H04B 17/382 |
| 2024/0330263 A1* | 10/2024 | Jarvis | ................. | G06F 16/2272 |

FOREIGN PATENT DOCUMENTS

| | | |
|---|---|---|
| WO | 2006011077 A1 | 2/2006 |
| WO | 2017063884 A1 | 4/2017 |

OTHER PUBLICATIONS

PCT International Search Report and Written Opinion, Application No. PCT/EP2020/052578, mailed Feb. 25, 2020, 10 pages.

Fan, Ouyang, Xu Dongdong, Zhang Xingnan, and Chen Chunlin. "Modeling and analysis of energy consumption for ZigBee-based wireless sensor networks." In Proceedings of the 31st Chinese Control Conference, pp. 6638-6643. IEEE, 2012.

* cited by examiner

ROTATING COORDINATOR IN MESH NETWORK

CROSS-REFERENCE TO RELATED APPLICATIONS

The present application is a national stage entry of PCT/EP2020/052578 filed Feb. 3, 2020, which claims priority to NL 2022497 filed Feb. 1, 2019, the contents of each of which are hereby incorporated by reference.

The present invention relates to a mesh network comprising multiple communication devices adapted to communicate in the mesh network according to a predetermined protocol, wherein a single one of the multiple communication devices adopts the coordinator role in the mesh network for governing a commissioning procedure in the mesh network.

Mesh networks with multiple communication devices are known and widely used to interconnect and communicate with external devices in a predetermined area. An example of such network is an outdoor luminaire network wherein communication modules using short range communication protocols such as zigbee are provided at each luminaire. By outdoor luminaires, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas and access roads to private building infrastructures, etc. In this example, the luminaire is the external device and the zigbee communication module is the communication device. The outdoor luminaire network may comprise multiple sensors generating sensor data, which sensors are also provided with zigbee modules for communication in the network. A zigbee mesh network is an example of a mesh network that is characterized by having a single device adopting a coordinator role. The coordinator governs the commissioning procedure of secured and unsecured networks, allowing to discover and join new communication apparatuses in the network.

Mesh networks have proven to be reliable and efficient for communicating with the luminaires and the sensors in the outdoor luminaire network. Via a remote management system, lights can be controlled based on time and/or obtained data. Obtained data is defined as at least one of received data, measured data, sensor data and pre-programmed data. Illumination instructions can be distributed in the mesh network in the form of algorithms and/or a set of rules, such that luminaires can dynamically react to obtained data that is distributed in the network.

Tests have shown that adding a new communication device into the network becomes an issue particularly when the network extends over a large physical area or when the network comprises a large number of devices. A new communication device is added to the network, for example to replace an existing, outdated or broken communication device. Alternatively new communication devices are added to further expand the network. When a new communication device is added, the commissioning procedure allows the new communication device to join the network. This commissioning procedure is governed by a single device in the network, particularly the device adopting the coordinator role. When the new communication device is added in the network at a location outside of the direct or limited hop range of the device adopting the coordinator role, the new communication device cannot join the network. Several solutions have been proposed, briefly discussed hereunder.

A first solution is found in subdividing the network in subareas. The subareas are interconnected via a remote server. In each subarea, a different network with different settings is created. These different networks are linked via the remote server. The network of each subarea can have a device with a coordinator role such that commissioning of new devices is facilitated.

A drawback of this solution is that devices from one subarea can only communicate to devices from another subarea via the remote server. This appears to be a significant disadvantage when the luminaires are dynamically operated using e.g. local sensor data. For example, when luminaires are controlled based on motion detection sensors, a motion detector located at a border of a first subarea can detect a motion and send a corresponding message to neighboring devices. However, the neighboring devices in the other subarea cannot receive this message unless it has been explicitly programmed to send this message via the remote server to neighboring devices of the other subarea. A further disadvantage of communicating via the remote server is latency. It will take messages significantly longer time to reach a neighboring device when the message is sent via the remote server, compared to directly transmitting the message.

Another solution is to physically bring new communication devices into the proximity of the device having the coordinator role before installing the new communication device in its final position. This solution significantly reduces the maintenance efficiency of the network, which is a drawback. For example in large city areas, this could require that an operator should carry the new communication device to one side of the city, where the device having the coordinator role is located, and subsequently installs the communication device at the other side of the city. Also in networks with a large number of devices, the solution of bringing the new communication device into proximity of the device having the coordinator role is suboptimal.

It is an object of the present invention to facilitate adding new devices in a mesh network wherein a single device adopts the coordinator role. It is a further object to increase the security of these mesh networks.

To this end, the mesh network of the invention is characterized in that the mesh network is configured to rotate the coordinator role among at least a selected number of multiple communication devices so that a new communication device is detectable in the vicinity of the device adopting the coordinator role.

By rotating the coordinator role among a number of multiple communication devices, the physical area wherein a new communication device is detectable is also rotated in the area covered by the network. This allows an operator to install a new communication device anywhere in this area, independent from the position of the device having the coordinator role. The coordinator role is rotated such that when a device in the mesh network in the vicinity of the new communication device is selected to adopt the coordinator role, this device governs the commissioning procedure to join the new communication device in the mesh network. Using the rotating coordinator role, it becomes possible to create a single mesh network over a large physical area without having the above-mentioned drawbacks. The latter physical area is large compared to the physical area that would be in reach of the device with the coordinator role. The rotating coordinator role also allows creating networks with a large number of communication devices without having the above-mentioned drawbacks. Without the rotating coordinator, mesh clusters can have up to about 150 communication devices. With the rotating coordinator, the number of communication devices in a single mesh network can go up to 10000 or even 20000 and more.

Tests have shown that, particularly for luminaire outdoor networks, it is not a noteworthy disadvantage that the joining of a new device could takes some time. In large areas, it can take up to 20-30 hours for a device in the vicinity of the new device to be selected as device adopting the coordinator role. The skilled person will understand that in networks extending over a large area, for example city areas, where luminaire networks are installed, it can take up to a day for a device in the vicinity of the new communication device to adopt the coordinator role in the network. This is a significantly smaller burden than physically bringing the new communication device into the vicinity of the device having the coordinator role before installing the new communication device at its intended position in the network.

Although the invention is conceived in relation to luminaire networks, the underlying problem and corresponding solution are also relevant for other than luminaire networks. In general, Internet-of-Things (IoT) networks provide a communication mechanism for smart devices allowing these devices to be controlled by and/or provide information to other devices, remote servers, operators and/or users. In such context, it is a benefit to have a single network extending over a large physical area with a mechanism to facilitate adding new devices to the network. Yet another network wherein the invention is applicable is a network for smart meters such as electricity meters, water meters and/or gas meters. There is a growing need to enable these smart meters to communicate with each other and with a remote server. The invention provides a mechanism to create large mesh networks and/or networks extending over a large physical area.

Preferred embodiments relate to a luminaire system of an outdoor luminaire. By outdoor luminaire, it is meant luminaires which are installed on roads, tunnels, industrial plants, stadiums, airports, harbors, rail stations, campuses, parks, cycle paths, pedestrian paths or in pedestrian zones, for example, and which can be used notably for the lighting of an outdoor area, such as roads and residential areas in the public domain, private parking areas, access roads to private building infrastructures, etc.

Preferably each of the selected number of devices is configured for adopting one of at least a participating role and the coordinator role, and the network is configured to rotate the coordinator role by consecutively selecting a single device from the selected number of devices and switching the selected device from participating role to coordinator role and back.

By configuring the selected number of devices such that they can either participate in the network or can coordinate the network, rotating the coordinator role can be implemented easier. In particular, each of the selected number of devices is configured for adopting the participating role, wherein the device merely participates in the mesh network, or the coordinator role, wherein the device governs the commissioning procedure in the network. The network is configured to rotate the coordinator role by selecting a single device from the devices in the network, and by switching the selected device from the participating role into the coordinator role and back. After the device has switched back into the participating role, another device can be selected to be switched from participating to coordinator role and back. Via this mechanism, the coordinator role can be rotated among multiple devices in the network while avoiding having multiple coordinators at the same time with the same settings.

A skilled person will understand that the coordinator role is preferably rotated such that subareas in the large physical area covered by the network at some point in time have a device adopting the coordinator role at least in vicinity. In other words, the selected number of devices is chosen such that the combined areas individually covered by each one of the selected number of devices covers substantially the whole area in which the network extends.

The practical mechanism for the network to select a single device can be implemented in different ways. A simple way is to predefine a time schedule with multiple consecutive timeslots, and to assign a single communication device to each timeslot. This time schedule can be distributed in the network so that devices know when to switch to the coordinator role and back. It could alternatively be advantageous to dynamically select the device adopting the coordinator role based on external information. An operator could notify the network management system that new device will be installed in a specific area, and the network could select devices for adopting the coordinator role in or around this specific area. Such mechanism would require more extensive programming. However, such mechanism would further facilitate and speed-up the installation of new communication devices in the network.

Preferably, the participating role comprises a routing role and/or an end device role. Particularly in the zigbee context, a network device not adopting the coordinator role is either a routing device or an end device. Details of routing device and end device is included by reference to the IEEE 802.15.4 international standard.

Preferably, the new communication device is preconfigured with default settings. Default settings can be for example factory settings. The operator is aware that the new communication device is configured with default settings, and can use this knowledge to adopt the new communication device in the network.

Preferably, the rotating coordinator role is associated with default settings such that the new communication device is discoverable in the mesh via the device adopting the coordinator role, and the network is configured, when the new communication device is discovered, to execute a predetermined set of steps to join the new communication device into the mesh network. Further preferably, the predetermined protocol is related to custom settings to obtain secured and encrypted communication in the network.

Particularly, when a network is operated with custom settings, it would be uncommon to switch a device into a coordinator role with default settings. This would mean that the device is temporarily out of the communication network and into a new network with default settings. However, this does provide the possibility to communicate with a new communication device having default settings. Therefore, this new communication device with default settings can be detected, and a set of steps can be executed to join the new communication device into the network with the custom settings.

The advantage of having a mesh network with custom settings is that the network can be operated in a secured manner and with encrypted communication. By rotating the coordinator role with default settings, it is not necessary to preconfigure a new communication device with the custom settings, which is an advantage from production point of view. During production, all communication devices can be produced and provided with factory settings. The mesh network comprises a mechanism to add the communication devices with factory settings into the network having the custom settings. This allows each network operator to choose its own custom settings thereby significantly increasing the security and encryption of the mesh network.

As an alternative, or in combination with the previous embodiments, the new communication device is configured with custom settings. It remains an option to configure the new communication device with custom settings. Further preferably, the rotating coordinator role is associated with the custom settings such that the device adopting the coordinator role is able to join surrounding device with custom settings into the mesh network. When mesh networks extend over a large physical area, even when the new communication devices would be provided with custom settings already, it remains a burden to join these devices into the network via a single device governing the commissioning procedure. Many new communication devices will be out of reach of this device so that they cannot be joined into the network. By rotating the coordinator role with the custom settings, such new devices with custom settings can be discovered and joined into the network.

Preferably, each one of the selected number of the multiple communication devices comprises a memory adapted to store network settings comprising at least one of the custom and default settings and is configured to retrieve the network settings from the memory when switching the selected device from participating role to coordinator role and back. Via the memory, the device can be preconfigured for switching its roles. Because the devices can simply retrieve their settings from the memory, a device with a participating role in a custom network can simply re-adopt this role after having been switched to other settings. Because the participating role can be re-adopted using settings from the memory, there is no need for this device to follow the commissioning procedure again to enter the network.

Preferably, the mesh network is a zigbee network.

The invention further relates to a method for joining a new communication device into a mesh network, the mesh network comprising multiple communication devices adapted to communicate in the mesh network according to a predetermined protocol related to custom settings to obtain secured and encrypted communication in the mesh network, wherein a single one of the multiple communication devices adopts a coordinator role in the mesh network for governing a commissioning procedure in the mesh network, the method comprising:

rotating the coordinator role among a selected number of the multiple communication devices by appointing said one single device from the selected number of devices;

switching the role of the appointed device into the coordinator role;

switching back the role of the appointed device;

appointing another single device from the selected number of devices;

detecting said new communication device by the device adopting the coordinator role; and joining the new communication device into the mesh network.

The issues of joining a new communication device in a mesh network that extends over a large physical area are described above. It is also described above that by rotating the coordinator role among multiple devices in the network, new devices are likely to be located in the vicinity of at least one of these devices rotating the coordinator role. Therefore, a new communication device can be installed and this device will be joined into the network when a device in the network in the vicinity of the new communication device is switched into the coordinator role. The method of the invention provides a mechanism to rotate the coordinator role and thereby to join communication devices into a network extending over a large physical area. In some embodiments, the coordinator is not allowed to join a device in the network by itself. The coordinator transmits the request message of the new communication device to a server, which server provides custom credentials for the new communication device to join the network. Based on these credentials, the coordinator can join the new communication device in the network.

Preferably, the step of switching back is executed at a predetermined time after the step of switching. By predefining a predetermined time, it can be avoided that multiple devices in the network adopt the coordinator role at the same time. Particularly, in some types of networks, for example a zigbee network, having multiple devices simultaneously adopting the coordinator role could lead to problems.

Preferably, the step of joining comprises exchanging security keys between the device adopting the coordinator role and the new communication device. These security keys form part of the custom settings that the new communication device needs in order to be able to communicate in the mesh network.

Preferably, the joining step comprises registering the new communication device at the remote server. Part of the commissioning procedure, the new communication device is registered at a remote server. By registering the new communication device at the remote server, the server is notified and the operator of the network is notified that the new device has been installed and wants to join into the network. Mechanisms can be further implemented to give the remote server an active role in the commissioning procedure, wherein the remote server is requested to confirm that the new communication device can be joined into the network. When extending a network or replacing a device, the remote server can be informed that a new device will be added, if relevant a procedure to replace a device is executed at the server, and upon request of the new device to join the mesh network, the remote server can confirm that this device is expected to join the network. This further improves the security of the mesh network.

Preferably, the multiple communication devices are operated with a participating role and the step of switching back comprises retrieving participating role settings from a memory of the device, and restoring the participating role using the received settings. Because settings are stored in the memory, the device can easily switch between different roles using the settings in the memory.

Preferably, the new communication device is preconfigured with default settings. Default settings can for example be factory settings.

Preferably, the coordinator role is associated with default settings such that the new communication device is discoverable in the mesh network via the device adopting the coordinator role and the method comprises executing a predetermined set of steps to add the discovered new communication device into the mesh network. The effects and advantages of these features are described above in relation to the mesh network.

Preferably, the predetermined set of steps comprise:

receiving a request message to join the network from the new communication device;

switching the coordinator role into custom settings to enable communication in the mesh network;

transmitting the request message to the remote server via the mesh network;

receiving from the remote server configuration settings for the new communication device;

switching the coordinator role into the default settings to enable communication with the new communication device; and transmitting the configuration settings to the new communication device.

By switching the device with the coordinator role in default settings, this device temporarily looses the ability to communicate in the mesh network with custom settings. The device with the coordinator role in default settings may first search for new devices. Alternatively, the new communication devices send broadcast messages that can be received by the coordinator device with the coordinator role in default settings. When a new communication device is detected, the new communication device typically sends a request message to the device adopting the coordinator role requesting to join the mesh network. The device with the coordinator role stores this request message in a memory, and switches to custom settings, so that the device can communicate in the mesh network. It is noted that the device may easily switch to custom settings if the custom settings are stored in the memory of the device. Alternatively, the device could rejoin the network via a subsequently selected device adopting the coordinator role, which subsequently selected device is preferably selected in the neighborhood of the device. After switching, the device forwards the request message via the mesh network to the remote server. The remote server sends a response message comprising the configuration settings for the new communication device. These configuration settings are received by the device adopting the coordinator role, and stored in the memory thereof. Then the device adopting the coordinator role switches back to default settings so that this device is able to communicate with the new communication device. In default settings, the device with the coordinator role forwards the message with configuration settings to the new communication device. Via this mechanism, the new communication device is provided with configuration parameters.

Preferably, the method further comprises switching the coordinator role back into custom settings to join the new communication device with the new communication settings into the mesh network. By switching the coordinator device back from default settings into custom settings, the coordinator device can govern the commissioning procedure in the custom mesh network. The new communication device has received the new communication settings, and is therefore able to communicate with communication devices in the custom mesh network. By switching the coordinator role from default settings into custom settings, this device adopting the coordinator role, which is in the vicinity of the new communication device, can also join this new communication device into the mesh network. The above mentioned predetermined time between switching and switching back is preferably chosen such that the device adopting the coordinator role can at least perform the above mentioned set of steps to join a new communication device in the network.

Preferably, the predetermined set of steps are executed by the appointed one single device. The appointed one single device uses the timeslot not only to detect the new communication device in default setting and provide it with custom settings, but also to adopt the new communication device in the network with the custom settings.

The invention further relates to a communication device comprising a short distance communication module adapted to communicate in a mesh network comprising multiple communication devices, wherein the mesh network is configured such that a single one of the multiple communication devices adopts a coordinator role for governing a commissioning procedure in the mesh network, the communication device being configured for switching between a participating role and said coordinator role. This communication device can be used in the mesh network of the invention. The effects and advantages are described above.

The invention will now be described in more details with respect to the drawings illustrating some preferred embodiments of the invention. In the drawings:

FIG. 1 schematically illustrates a mesh network adopting a new communication device;

FIG. 2 schematically illustrates a mesh network extending over a large area;

In the drawings a same reference number has been allocated to a same or analogous element.

Figure 1:
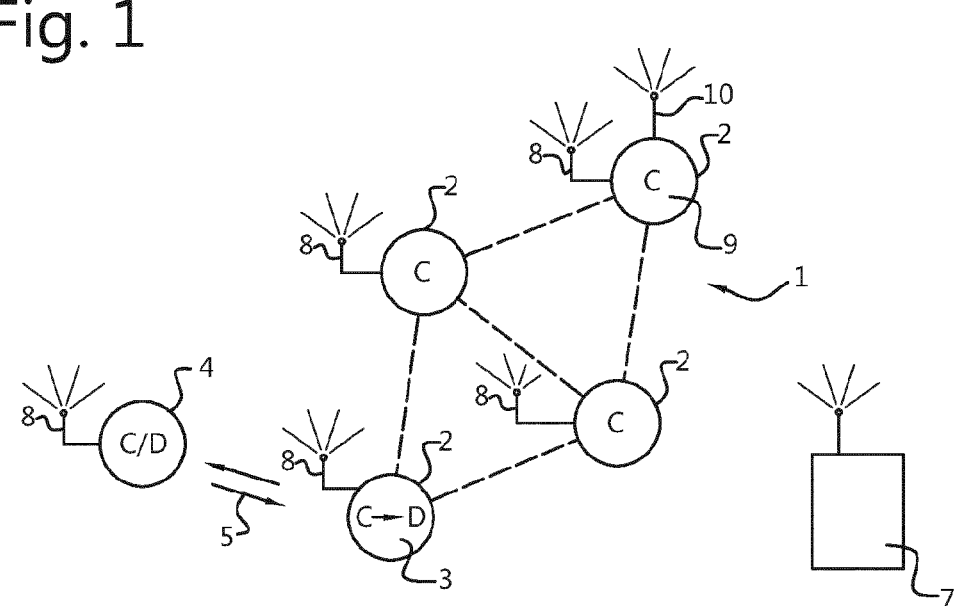

FIG. 1 illustrates a network 1 having multiple communication devices 2. The multiple communication devices 2 form a mesh topology. To this end, each of the communication devices 2 has a communication module 8 using a short distance communication protocol. A known example of such short distance communication protocol is zigbee. Other short distance communication protocols can also be used, for example: thread IPv6 network protocol, Bluetooth mesh protocol or other mesh protocols. In the embodiment of FIG. 1, a single one of the communication devices 2 is formed as a border device 9. The border device 9 is characterized by having a long distance communication module 10 additionally to the short distance communication module 8. This enables a border device to communicate with a remote server 7. In other embodiments, multiple communication devices 2 in the network 1 could be formed as a border device 9, so that multiple devices 2 can communicate with the server 7. Communication devices not having a long distance communication module can communicate with the remote server 7 indirectly, via a border device 9. The network 1 is therefore adapted to forward messages addressed to the server 7 to a border device 9, which sends it to the server 7.

The network 1 is characterized by having one communication device 2 in the network 1 to adopt the coordinator role. The device 2 adopting the coordinator role is also called the coordinator device. In FIG. 1, the coordinator device is provided with reference number 3. In the embodiment of FIG. 1, the coordinator device 3 is not a border device 9, and can therefore only communicate with the server 7 via the border device 9. In the embodiment of FIG. 1, there is no direct connection from the coordinator device 3 to the border device 9 so that the message will need multiple so-called hops in the network to reach the border device 9, and for being transmitted to the remote server 7. In other embodiments, the coordinator device could be in direct connection with the border device or could be a border device. Hopping mechanisms are known and therefore not further described in this description.

The coordinator device 3 governs the commissioning procedure in the network. Commissioning is the process of connecting communication devices to each other in the network. Commissioning includes searching for appropriate networks to join; joining the correct network; determining which nodes on the network to talk to; determining how to talk to those other nodes (groups, bindings or directly). In other words, commissioning is the process of configuring the communication devices in the network so that they can communicate data to each other. Part of this process comprises exchanging security keys to allow secured and encrypted communication in the network.

Embodiments of the present invention are conceived in the development of secure networks 1, being networks 1 with custom settings. Devices in the network 1 are provided with custom communication settings. This is illustrated by reference C.

A first embodiment will be described wherein a new communication device 4 is added to the network. For the first embodiment, it is assumed that the new communication device 4 is already provided with custom settings C. However, to be able to join the network, the new communication device 4 needs to follow the commissioning procedure which is governed by the coordinator device 3.

In FIG. 1, the new communication device 4 is installed in the vicinity of the device 3, which is the coordinator device. This allows the coordinator device 3 to exchange messages 5 with the new communication device 4. In particular, the messages 5 could be part of a commissioning procedure including exchanging security keys, registering the new communication device 4 at the server 7, finding the nearest border router 9 in the network 1 for the new communication device 4, selecting and/or setting up connection with an NTP-server or other network services.

It will be clear, when the network 1 extends over a large physical area, it is not likely that the new communication device is installed in the direct vicinity of the coordinator device 3. Therefore, a first embodiment of the invention relates to rotating the coordinator role with custom settings among a selected number of devices. In the embodiment of FIG. 1, coordinator role 3 could be rotated between devices that are shown in FIG. 1 as the device 3 and the device 9. According to one embodiment, a time schedule is provided comprising multiple consecutive timeslots. Each timeslot is assigned to a single communication device 2 in the network 1 to allow communication device 2 to adopt the coordinator role within the predetermined timeslot. Such mechanism is easy to implement, and ensures that there is only a single coordinator device 3 in the network 1. When a communication device is not in the coordinator role, it adopts a participating role. In other words, when a device is not coordinating the network it participates in the network. In the zigbee protocol, devices can have a router role or an end device role, both considered as participating roles in the network. The mechanism described above allows to join a new communication device with custom settings into the network 1.

In a preferred embodiment, substantially all devices in the network are adapted to adopt the coordinator role. Further preferably, the coordinator role is rotated among substantially all communication devices in the network. Calculations have shown that even in networks with more than 50000 devices, providing timeslots of 2.5 seconds will allow each device to adopt the coordinator role within a total period of 48 hours. In this example, every 48 hours the complete network is scanned for new communication devices. The MAC addresses of the communication devices can be used to assign timeslots to the devices. Each MAC address can be assigned to a predetermined timeslot.

In a second embodiment, it is assumed that the new communication device 4 is provided with default settings, illustrated in FIG. 1 with reference D. Default settings are e.g. factory settings. It will be clear for a skilled person that a device with default settings D is unable to communicate with communication devices 2 in a custom configured network. The configuration parameters determine the digital language that a device speaks, such that a default configured device cannot understand messages of a custom configured device, and vice versa. This significantly increases the security of the network 1, however it complicates adding a new communication device into the network 1. It is insufficient to have a coordinator device 3 with custom settings in the network 1.

To add a new communication device 4 with default settings, it is therefore necessary to rotate a coordinator device with default settings in the network 1. In FIG. 1, this is illustrated by C→D, which is shown in coordinator device 3. This illustrates that the coordinator device 3 is switched from custom settings into default settings. When the coordinator device 3 is in default settings, this device looses the ability to communicate in the network 1. When switched to default settings, this device becomes a part of another network, particularly a "default network". To be able to switch back to custom settings, the communication device 2 comprises a memory wherein operational settings can be stored. Before switching from custom settings to default settings, the coordinator device 3 stores its custom settings into its memory. This allows the device to switch back to custom settings, using the data stored in the memory. The method to join a new communication device 4 with default settings into a custom network 1 is explained hereunder in relation to FIG. 3.

The device adopting the coordinator role with custom settings factually belongs to a different network than the device adopting the coordinator role with default settings. Therefore, these two devices can be present in the network at the same time without violating the rule that only a single coordinator device can be present in the network. When the network 1 is a custom network C, only the device with the custom settings will be considered a coordinator in the network. The coordinator device with default settings will be considered as belonging to another network.

In the first embodiment, described above, rotating the coordinator role means rotating the coordinator role with custom settings in the network. This allows new devices with custom settings to be added in the network.

In the second embodiment, described above, rotating the coordinator role means rotating the coordinator role with default settings. This allows new communication devices with default settings to be detected. Preferably, the device adopting the coordinator role with default settings is provided then to send custom settings to the new communication device 4. This would mean that the new communication device can reboot with custom settings and become a new communication device with custom settings in the network 1. This new communication device with custom settings would then need a coordinator device 3 with custom settings in its vicinity to be joined to the network 1.

In a third embodiment, rotating the coordinator role means both rotating the coordinator role with custom settings and the coordinator role with default settings at the same time in the network 1. According to this embodiment, both new devices with default settings and new devices with custom settings can be detected. The new devices with default settings can be provided with custom parameters while the new devices with custom settings can be adopted in the network. This third embodiment is a combination of the first and second embodiment at the same time.

Figure 3:
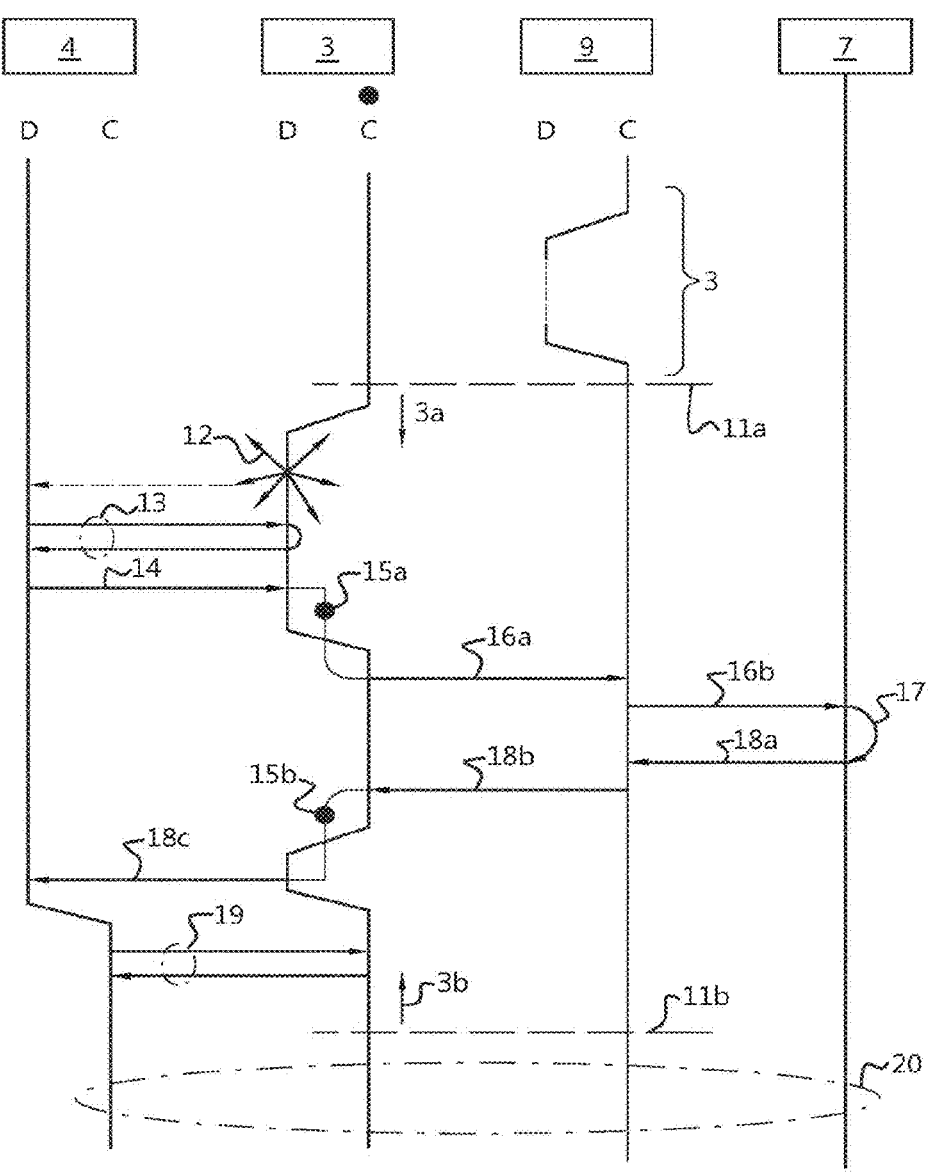
FIG. 3 shows an example of a commissioning procedure.

In a fourth embodiment, described hereunder in relation to FIG. 3, further improves the above mentioned embodiments. According to this latter embodiment, a single device is selected in the network 1, which single device is switched into coordinator role with default settings and with custom settings within a single timeslot.

Figure 2:
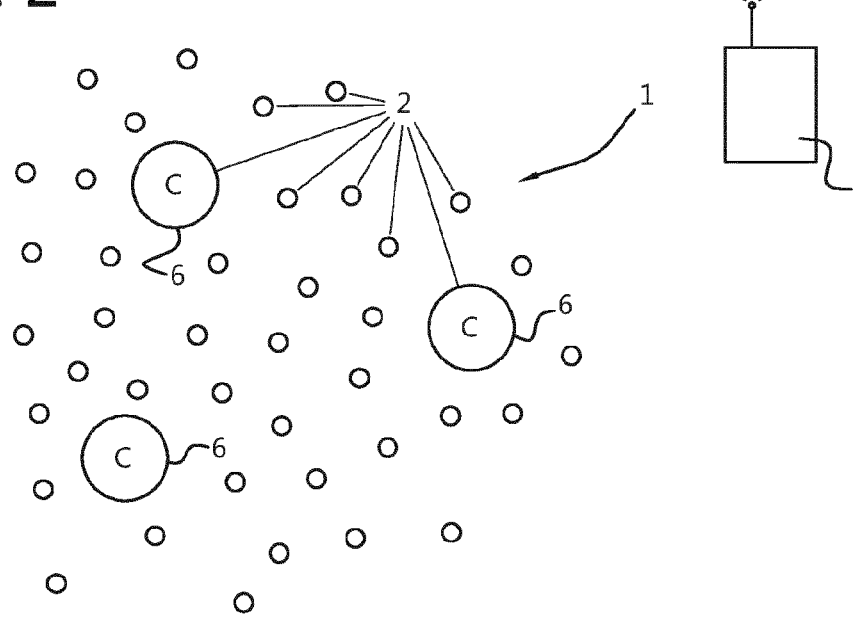

FIG. 2 illustrates a network with multiple communication devices 2 extending over a large physical area. In the embodiment of FIG. 2, it is assumed that communication devices 2 at one side of the area are unable to communicate with communication devices 2 at the other side of the area. Thereby "able to communicate" is further defined as being able to communicate with a reasonable amount of hops. A reasonable amounts of hops is preferably defined as maximum ten hops, preferably maximum five hops.

When such network is designed and installed, it is preferably installed using default settings. New communication devices are manufactured and preconfigured in the factory. The network 1 can be built, at least partially, using the factory settings. For example, when new lighting equipment is installed, and communication devices are added to the luminaires to communicate with each other, with sensors in the environment, and with a remote server, such network is preferably built with default settings. When the network is up and running, all devices 2 are part of a default network.

To improve the security of the network, custom settings are distributed to all communication devices 2 in the network. At a predetermined moment in time, typically determined by the remote management server, all devices in the default network are rebooted with the received custom settings. At that moment, one device in the network will adopt the coordinator role, and will govern the commissioning procedure for surrounding devices so that these devices, which also have the custom settings, can be joined into the custom network 1. Since the network extends over a large physical area, it is necessary to rotate the coordinator role among a selected number of devices in the network 1. In FIG. 2, the selected number of devices is indicated with reference number 6.

By rotating the coordinator role among the selected number of devices 6, all devices in the network can be joined to the network with the custom settings. This procedure to create a custom network can also be used to change the network settings from first custom settings to second custom settings. In the embodiment of FIG. 2, it is assumed that all devices 2 in the network are provided with the custom settings before being switched from default into the custom settings. It is only at a predetermined moment in time, determined by the operator or management system, that the devices are switched from default settings into custom settings.

FIG. 3 illustrates the method to adopt a new communication device 4 with default settings D into a network 1 at least comprising the coordinator device 3, the border device 9 and a remote server 7. FIG. 3 illustrates a timeline wherein time progresses top-down. At the start, the device 3 and device 9 are in custom mode, forming a custom network. The network is configured to rotate the coordinator role, and in the embodiment of FIG. 3, device 9 starts with adopting the coordinator role 3 for a predetermined time period. During this time period, device 9 switches from custom settings into default settings, as is illustrated by the offset part in the line under device 9.

At a certain moment in time, illustrated in FIG. 3 with dotted line 11a, device 3 becomes a coordinator device and device 9 is switched to a participating role in custom settings. It is also assumed, in line with FIG. 1, that the new communication device 4, being in default settings D, is in the vicinity of the coordinator device 3.

Coordinator device 3 switches to default settings D and sends a broadcast message 12. New communication devices 4 are programmed to react to this broadcast message 12. As a result of the broadcast 12, a first authentication exchange of messages 13 occurs between the coordinator device in default settings and the new communication device in default settings. When a connection is established, a registration message 14 is sent by the new communication device to the coordinator device. In this registration message 14, the new communication device requests custom settings. The skilled person will understand that instead of broadcasting via the coordinator device 3, the new communication device could perform the broadcasting.

When the coordinator device 3 is operated with default settings, it is unable to communicate to the border device 9 and to the server 7. Therefore, the coordinator device 3 is switched back to custom settings C. Before switching to custom settings, the registration message 14 received from the new communication device 4 is stored in a memory, illustrated with 15a. After switching to custom settings C, the registration message is forwarded 16a to the border device 9 which also forwards it 16b to the remote server 7. The remote server 7 processes 17 the registration message to see whether the new communication device is allowable in the network. When the server 7 determines that the new communication device 4 may be provided with custom settings, it sends a configuration message 18a to the border device 9 who forwards it 18b to the coordinator device 3.

The coordinator device 3 in custom settings cannot communicate with the new communication device 4 in default settings. Therefore, the coordinator device 3 stores the configuration message 18, illustrated with 15b, and switches to default settings D. In default settings, the coordinator device 3 forwards the configuration message 18c to the new communication device 4. This allows new communication 4 to switch to custom settings C. The coordinator device 3 also switches to custom settings C after having forwarded the configuration message 18c to the new communication device. In particular, the coordinator device 3 switches to adopt the coordinator role in custom settings C.

Being the coordinator device with custom settings, device 3 is able to govern the commissioning procedure 19 and to join the new communication device 4 into the custom network directly after having forwarded the configuration message 18. Following this procedure, the new communication device 4 can be joined into the network. After joining, the network is operational 20 including the new communication device.

The coordinator device 3 adopts the coordinator role between arrows 3a and 3b. Dotted line 11b illustrates the end of the timeslot wherein device 3 can adopt the coordinator role. Therefore, under dotted line 11b, the coordinator device 3 adopts a participating role. From this example, it is clear that the device 3 adopts both the coordinating role in default settings and the coordinating role in custom settings within the timeslot between 11a and 11b, to discover the new communication device, provide custom settings to the new communication device, and join the new communication device into the custom network.

Figure 4:
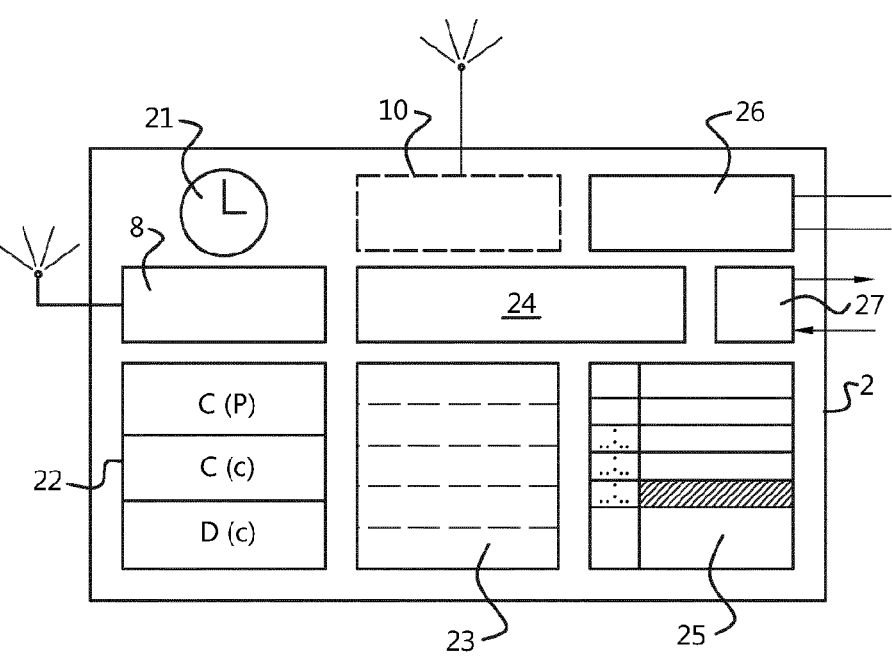
FIG. 4 shows a communication device.

FIG. 4 shows a schematic layout of a communication device 2 that is usable in the network to adopt both the participating role and the coordinating role. The communication device 2 comprises at least a short distance communication module 8. When the communication device 2 is a border device, it also comprises a long distance communication module 10.

The communication device 2 further comprises a clock 21 and comprises a settings memory 22. In the settings memory 22, custom settings with participating role C(p) are stored. Additionally, custom settings with coordinator role C(c) are stored. Further additionally, default settings with coordinator role D(c) are stored. This settings memory allows the communication device 2 to retrieve the settings it wants to adopt from the memory. Part of the joining procedure in the custom network may comprise storing at least the custom settings with the participating role in the memory. Additionally, the joining procedure may comprises storing the custom settings with coordinator role in the memory 22.

The communication device 2 further comprises a messages memory 23. The messages memory 23 allows storing messages received from another device, intended for transmission. This message memory is used e.g. in FIG. 3 for storing 15 the registration message 14 and the configuration message 18.

Preferably, the communication device further comprises a time schedule memory 25. In this time schedule memory, consecutive timeslots are listed in relation to different communication devices in the network. Within the timeslot, the related communication device may adopt the coordinator role. This time schedule memory 25 can be static or dynamic. The time schedule memory is preferably updatable by the remote server 7.

Communication device 2 further comprises a processor 24 for controlling the operation of the device 2. The device 2 typically further comprises a power supply 26 and at least one input/output 27. Via the input/output, data can be exchanged with an external device, e.g. a luminaire. Via the power supply, the communication module 2 receives power.

The explanation above is intended to provide support for, and at least the following passages provides explicit support for a mesh network (1) comprising multiple communication devices (2) adapted to communicate in the mesh network, preferably according to a short-range protocol. In this protocol, preferably in any given time period only a single one of the multiple communication devices (2) adopts a coordinator role in the mesh network. Preferably the coordinator role is for governing a commissioning procedure to join a new communication device in the mesh network. Preferably, to join the new communication device, the latter has to be located inside a limited hop range of the device adapting the coordinator role in order to join the mesh network. Preferably the mesh network is configured to rotate the coordinator role among at least a selected number of the multiple communication devices so that each of the selected communication devices adopts the coordinator role for a given time period. Preferably, the new communication device is located during at least one of these given time periods inside the limited hop range of one of the selected communication devices which adopt the coordinator role.

Whilst the principles of the invention have been set out above in connection with specific embodiments, it is to be understood that this description is merely made by way of example and not as a limitation of the scope of protection which is determined by the appended claims.

LIST OF REFERENCES 1. network
2. communication device
3. coordinator device 4. new communication device
5. message exchange
6. selected device
7. remote server
8. short-distance communication module
9. border device
10. long-distance communication module
11. select other device
12. broadcast
13. first authentication
14. registration message
15. store
16. forward registration message
17. process registration message
18. configuration message
19. joining procedure
20. operational
21. clock
22. memory settings
23. memory messages
24. processor
25. time schedule memory
26. power supply
27. input/output

The invention claimed is:

1. A mesh network comprising multiple communication devices adapted to communicate in the mesh network according to a predetermined protocol, wherein a single one of the multiple communication devices adopts a coordinator role in the mesh network for governing a commissioning procedure to join a new communication device in the mesh network, characterized in that the mesh network is configured for rotating the coordinator role among at least a selected number of the multiple communication devices so that a new communication device is detectable in the vicinity of the device adopting the coordinator role, and wherein the rotating of the coordinator role is done according to a predefined time-schedule with multiple consecutive timeslots, each timeslot corresponding to a single communication device of the selected number of the multiple communication devices.

2. The mesh network according to claim 1, wherein each of said selected number of devices is configured for adopting one of at least a participating role and said coordinator role, and wherein the network is configured to rotate the coordinator role by consecutively selecting a single device from the selected number of devices and switching the selected device from participating role to coordinator role and back.

3. The mesh network according to claim 2, wherein said participating role comprises a routing role and/or an end device role.

4. The mesh network according to claim 1, wherein said new communication device is preconfigured with default settings.

5. The mesh network according to claim 4, wherein the rotating coordinator role is associated with default settings such that said new communication device is discoverable in the mesh via the device adopting the coordinator role, and wherein the network is configured, when the new communication device is discovered, to execute a predetermined set of steps to join the new communication device into the mesh network.

6. The mesh network according to claim 1, wherein the predetermined protocol is related to custom settings to obtain secured and encrypted communication in the mesh network.

7. The mesh network according to claim 6, wherein said new communication device is configured with said custom settings.

8. The mesh network according to claim 7, wherein the rotating coordinator role is associated with said custom settings such that the device adopting the coordinator role is able to join surrounding new communication devices with custom settings into the mesh network.

9. The mesh network according to claim 8, wherein, prior to rotating the coordinator role associated with custom settings, the network is operated using default settings and wherein the custom settings are distributed among the multiple communication devices.

10. The mesh network according to claim 1, wherein each one of the selected number of the multiple communication devices comprises a memory adapted to store network settings comprising at least one of the custom and default settings, and is configured to retrieve the network settings from the memory when switching the selected device from participating role to coordinator role and back.

11. The mesh network according to claim 1, wherein the mesh network is a Zigbee network.

12. A method for joining a new communication device into a mesh network, the mesh network comprising multiple communication devices adapted to communicate in the mesh network according to a predetermined protocol, wherein a single one of the multiple communication devices adopts a coordinator role in the mesh network for governing a commissioning procedure to join a new communication device in the mesh network, the method comprising:

rotating the coordinator role among a selected number of the multiple communication devices by:

appointing said one single device from the selected number of devices;

switching the role of the appointed device into the coordinator role;

switching back the role of the appointed device; and appointing another single device from the selected number of devices;

detecting said new communication device by the device adopting the coordinator role; and joining the new communication device into the mesh network, wherein the rotating of the coordinator role is done according to a predefined time-schedule with multiple consecutive timeslots, each timeslot corresponding to a single communication device of the selected number of the multiple communication devices.

13. The method for building a mesh network according to claim 12, wherein the step of switching back is executed at a predetermined time after the step of switching.

14. The method according to claim 12, wherein the step of joining comprises exchanging security keys between the device adopting the coordinator role and the new communication device, and wherein optionally the joining step comprises registering the new communication device at a remote server.

15. The method according to claim 12, wherein the multiple communication devices are operated with a participating role, wherein the step of switching back comprises retrieving participating role settings from a memory of the device, and restoring the participating role using the retrieved settings, and wherein optionally the new communication device is preconfigured with default settings.

16. The method according to claim 12, wherein the rotating coordinator role is associated with default settings such that said new communication device is discoverable in the mesh via the device adopting the coordinator role, and wherein the method comprises executing a predetermined set of steps to add the discovered new communication device into the mesh network.

17. The method according to claim 16, wherein the predetermined protocol is related to custom settings to obtain secure and encrypted communication in the mesh network, and wherein the predetermined set of steps comprises:

receiving a request message to join the network from the new communication device;

switching the coordinator role into custom settings to enable communication in the mesh network;

transmitting the request message to the remote server via the mesh network;

receiving from the remote server configuration settings for the new communication device;

switching the coordinator role into the default settings to enable communication with the new communication device;

transmitting the configuration settings to the new communication device; and optionally switching the coordinator role back into custom settings to join the new communication device with the new communication settings into the mesh network, wherein preferably the predetermined set of steps are executed by the appointed one single device.

18. A communication device comprising a communication module adapted to communicate in a mesh network comprising multiple communication devices, wherein the mesh network is configured such that a single one of the multiple communication devices adopts a coordinator role for governing a commissioning procedure in the mesh network, the communication device being configured for switching between a participating role and said coordinator role, and wherein the communication device further comprises a settings memory adapted to store at least two network settings including:

custom settings configured to obtain secured and encrypted communication in the network; and default settings configured for detecting a new communication device and for governing the commissioning procedure of the new communication device to join the new communication device into the network with the custom settings.

19. The communication device of claim 18, further comprising a time schedule memory and a clock, the time schedule memory being adapted to list at least one timeslots wherein the communication device is allowed to adopt the coordinator role, wherein a processor is adapted to switch he communication device into the coordinator role based on the clock and content of the time schedule memory.

* * * * *